United States Patent [19]

Kethley

[11] Patent Number: 4,784,006
[45] Date of Patent: Nov. 15, 1988

[54] GYROSCOPIC PROPULSION DEVICE

[76] Inventor: Lancelot I. Kethley, 900 NE. Minnehaha St., B4, Vancouver, Wash. 98665

[21] Appl. No.: 84,973

[22] Filed: Aug. 12, 1987

Related U.S. Application Data

[63] Continuation-in-part of Ser. No. 814,409, Dec. 30, 1985, abandoned.

[51] Int. Cl.⁴ .............................................. F16H 27/04
[52] U.S. Cl. ..................................... 74/84 R; 180/7.1
[58] Field of Search ..................... 74/572, 84 R, 84 S; 280/217, 1; 244/172, 61; 440/3, 113; 180/7.1

[56] References Cited

U.S. PATENT DOCUMENTS

| | | | |
|---|---|---|---|
| 2,886,976 | 5/1959 | Dean | 244/172 |
| 3,555,915 | 1/1971 | Young, Jr. | 74/84 |
| 4,579,011 | 4/1986 | Dobos | 74/84 R |

FOREIGN PATENT DOCUMENTS

| | | | |
|---|---|---|---|
| 2825490 | 12/1979 | Fed. Rep. of Germany . | |
| 2926583 | 1/1981 | Fed. Rep. of Germany | 244/172 |
| 3219698 | 12/1983 | Fed. Rep. of Germany | 244/172 |
| 3234800 | 4/1984 | Fed. Rep. of Germany | 244/172 |
| 3438160 | 7/1986 | Fed. Rep. of Germany | 244/172 |
| 3512677 | 10/1986 | Fed. Rep. of Germany | 244/172 |
| 933483 | 4/1948 | France | 74/84 S |
| 1024328 | 3/1953 | France . | |
| 1377261 | 9/1964 | France | 74/84 S |
| 86404 | 12/1965 | France | 74/84 S |
| 2293608 | 6/1976 | France . | |
| 573912 | 3/1958 | Italy | 74/84 S |
| 580085 | 7/1958 | Italy | 244/172 |

Primary Examiner—Deborah L. Kyle
Assistant Examiner—Michael J. Carone
Attorney, Agent, or Firm—Kenneth S. Klarquist

[57] ABSTRACT

A gyroscopic propulsion device includes a rotatable body in which the center of mass of the rotating body is offset away from a first axis to a second axis. The body rotating around the eccentric second axis of the rotating body generates a propulsion force which moves a vehicle to which the device is attached. In preferred embodiments, the body includes a rotating flywheel or a planar system of spokes along which weights oscillate on springs.

12 Claims, 2 Drawing Sheets

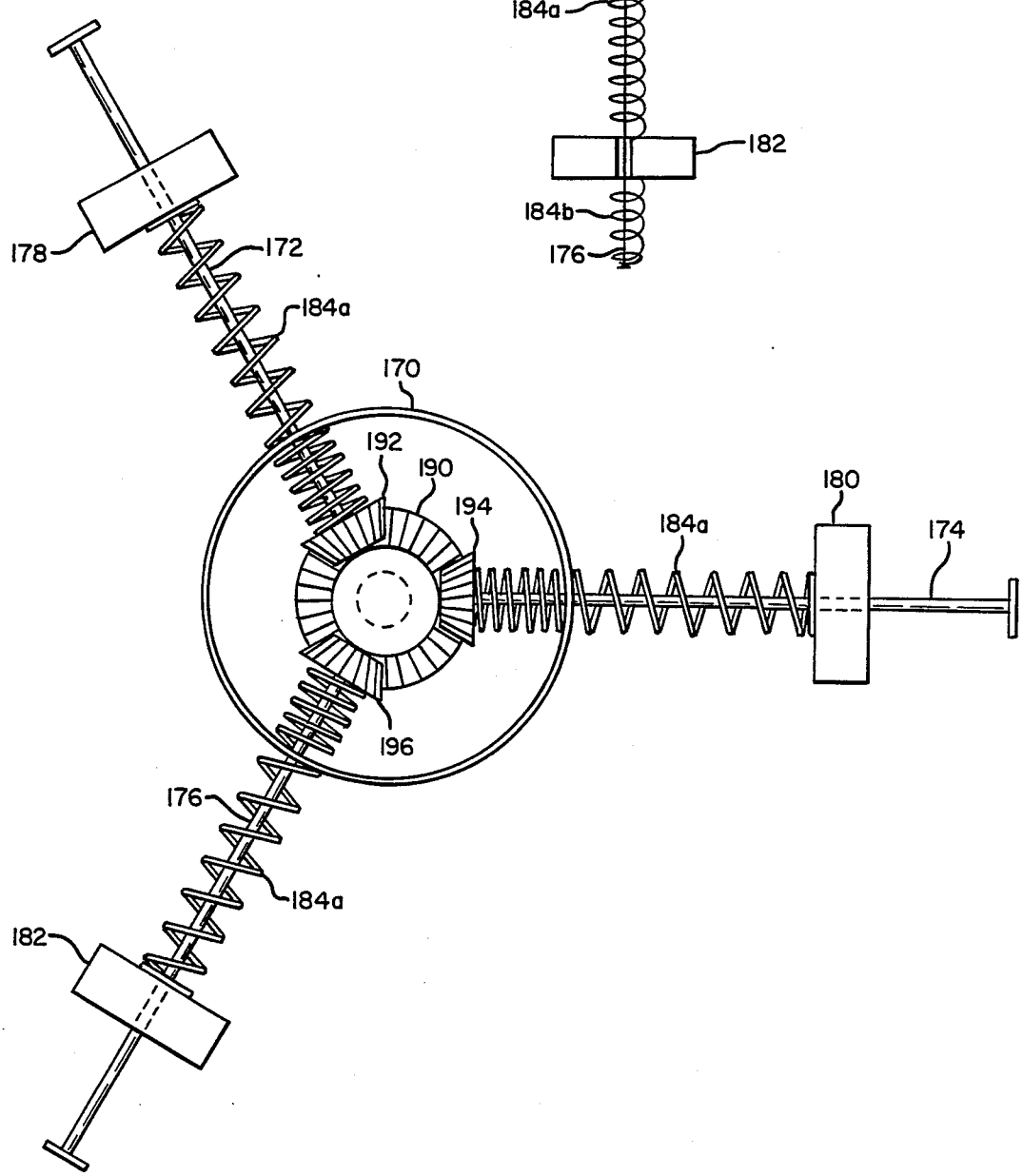

GYROSCOPIC PROPULSION DEVICE

CROSS REFERENCE TO RELATED APPLICATION

This application is a continuation-in-part of copending U.S. patent application Ser. No. 814,409, now abandoned filed Dec. 30, 1985. The disclosure of that earlier application is incorporated herein by reference.

BACKGROUND OF THE INVENTION

1. Field of the Invention

This invention concerns a propulsion device for propelling vehicles. More particularly, the invention concerns a gyroscopic propulsion device.

2. General Discussion of the Background

It has long been recognized that gyroscopic devices could provide propulsion for a vehicle. Examples of such propulsion devices are shown in U.S. Pat. No. 3,555,915; German Pat. No. 28 25 490; and French Pat. Nos. 1,024,328 and 2,293,608. Each of these devices rotates a first body about a primary axis and a set of secondary bodies about a secondary axis perpendicular to the primary axis. Essentially, these devices imitate the precession of four, radially connected spinning tops. The inventors of these previous devices did not understand that as a top attempts to maintain its level of its precession, it presses down on its tip. In these previous devices, a downward force is exerted at the center of the mechanism, which counterbalances the upward gyroscopic effect produced by the spinning bodies. In U.S. Pat. No. 3,555,915, the swinging action of the dumbbells of Young's gyroscopic device are not mechanically restrained. Therefore, those weights acquire positions in which the forces are balanced and no net force can be imparted to the gyroscopic device, not even from the shift of the centers of the dumbbells' combined masses upward. All that upward shift can do is either hinder the rotation around axis 10 if both rotations are counterclockwise or clockwise, or aid rotation about axis 10 if one rotation is clockwise and the other is counterclockwise.

The principle of gyroscopic propulsion can be understood by considering a top or gyroscope, which is a spinning body that rotates about an axis of rotation. When a force, such as gravity, is exerted on the body in such a way that it tends to change the direction of the axis of rotation, the body precesses in a direction perpendicular to the plane which contains the axis of rotation and the applied force. The gravitational center of the top moves on a more or less horizontal circle, hence almost perpendicular to the gravitational force which initiated the precession.

It is an object of this invention to harness, as opposed to imitating, the induced precession of a spinning body to propel a vehicle.

It is yet another object of the invention to provide a propulsion generator which is highly efficient.

It is yet another object of the invention to provide a propulsion generator which is useful in terrestial and aquatic.

SUMMARY OF THE INVENTION

The foregoing objects are achieved by a gyroscopic propulsion device for a vehicle which includes a rotatable body mounted on the vehicle, rotating means establishing a first axis of rotation for rotating the body, and offsetting means for restrained offsetting of said body to a second axis of rotation, about which the body rotates, away from and substantially parallel to the first axis of rotation for propelling the vehicle.

In one preferred embodiment, the rotatable body is a hub connected to a flywheel with flexible spokes which allow the geometric center of the flywheel to be offset relative to the hub. When the flywheel is in a vertical plane, gravity pulls the heavy flywheel downwardly, thereby displacing its geometric center and center of mass away from the axis of rotation of the hub. Then, as it begins to rotate around the secondary axis of rotation, the unbalanced centrifugal force further displaces the geometric center and center of mass, similar to the slowly dropping motion of the precessing top. This produces a gyroscopic action similar to the precession of the top, which action is transmitted through the hub axle to the vehicle for propelling the vehicle. If the spring spokes are selected to have a frequency which is the same as the frequency of rotation of the flywheel, the wheel remains offset downwardly and the vehicle moves in the direction of rotation of the flywheel at its lowest point. If the springs' frequency differs by one half frequency from the frequency of rotation, the flywheel is displaced upwardly and the vehicle will move in the direction the flywheel is rotating at its highest point.

In yet another embodiment, the rotating body does not include a flywheel but instead employs a plurality of equally spaced spokes rotating in a plane about a central hub. Each spoke carries a weight which can slide along the spoke. Each weight's sliding movement is controlled, however, by a first spring which extends from the weight to the hub, and a second spring which extends from the weight to the distal end of the spoke. The hub includes a mechanism for varying the number of active coils of the springs to alter their frequency.

Each embodiment of the invention provides a propulsion force by increasing the rotational impulse of the rotating body. Since the body rotates around an axis offset from the axis of drive, the rotational impulse is increased more at a point of the body which is farthest away from the first axis of rotation. This increased rotational impulse of the point causes the vehicle carrying the device to move in the direction of rotation along a tangent to the rotating body at its point of greatest relative rotational impulse.

The foregoing and other objects, features, and advantages of the invention will become more apparent from the following detailed description of several preferred embodiments which proceeds with reference to the accompanying drawings.

BRIEF DESCRIPTION OF THE DRAWINGS

FIG. 3 is a schematic view of a second embodiment of the invention in which weights are flexed by springs along spokes carried by a spinning hub.

FIG. 4 is an enlarged, schematic view of the hub shown in FIG. 3.

DETAILED DESCRIPTION OF PREFERRED EMBODIMENTS

Figure 1:
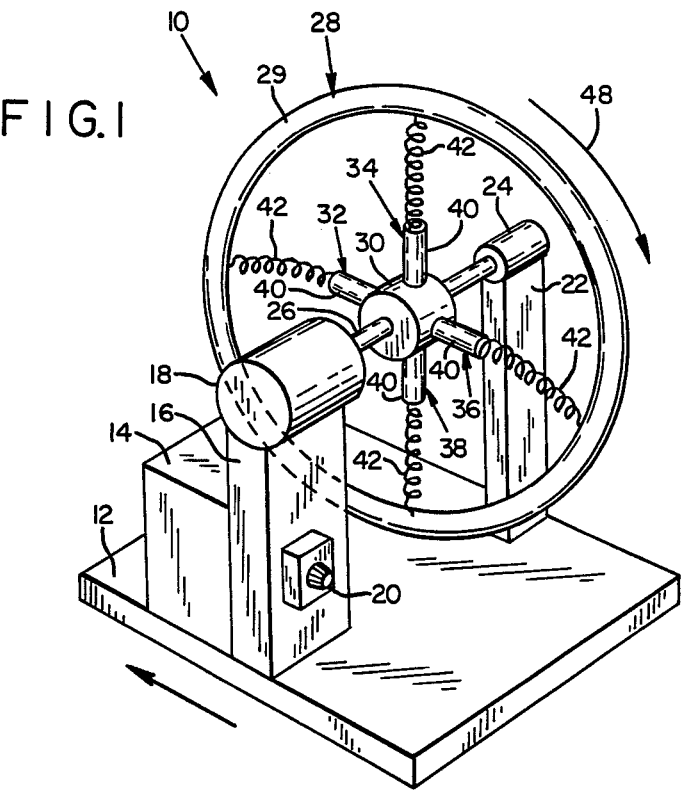
FIG. 1 is a perspective view of a first embodiment of the invention in which a flywheel is rotated through a hub having flexible spokes.

FIG. 1 shows a gyroscopic propulsion device 10 for a vehicle, which in this instance is a platform 12. Mounted on platform 12 are an energy source 14 (such as batteries), an upright standard 16 adjacent energy source 14, and a motor 18 mounted on top of standard 16. A conventional variable speed control 20 is provided for controlling the speed of motor 18.

An upright standard 22 is mounted on platform 12 opposite standard 16 and includes a cylindrical bearing housing 24 which is opposite a horizontal shaft 26 of motor 18. The shaft 26, which is rotated by motor 18, extends between motor 18 and bearing housing 24. Shaft 26 is journalled within housing 24 and rotates freely as the shaft is driven by motor 18.

Figure 2:
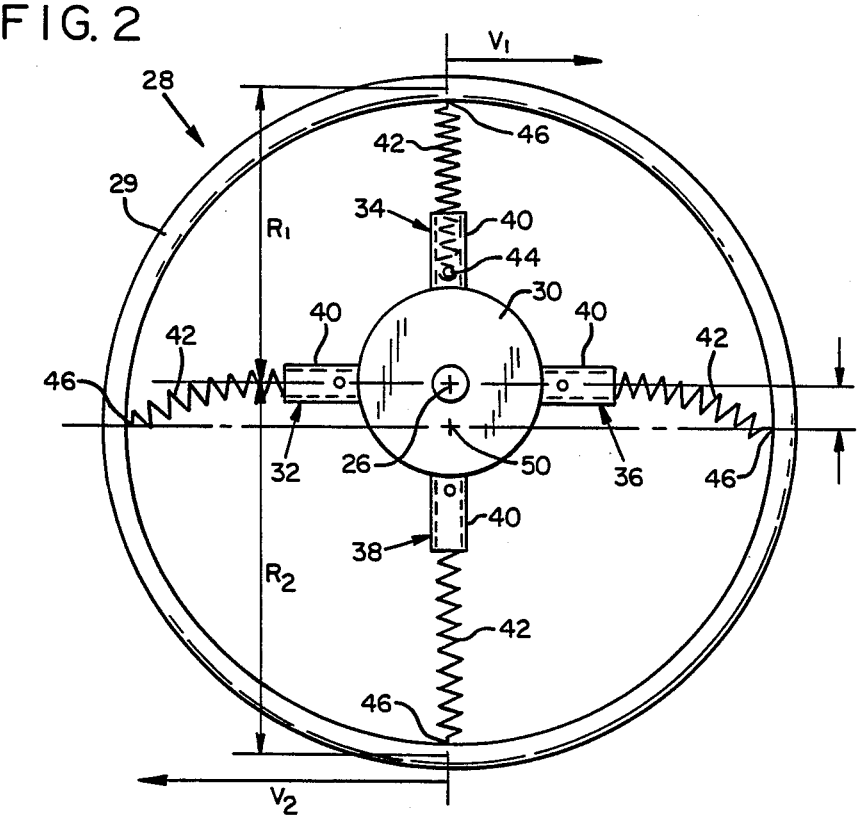
FIG. 2 is an enlarged, isolated side elevational view of the flywheel of FIG. 1 illustrating the eccentric axis of rotation of the flywheel.

A flywheel 28 is mounted on shaft 26 for rotation in a vertical plane. Flywheel 28 includes a rim 29, a cylindrical hub 30 which is fixed to and rotated with shaft 26, and flexible radial spokes 32, 34, 36, and 38 which interconnect rim 29 and hub 30. As best seen in FIG. 2, four spokes 32–38 are contained in a common plane and are separated by an arc of 90° from each adjacent spoke. Each spoke 32–38 consists of a hollow tube 40 which is fixed rigidly to hub 30 and extends radially toward flywheel 28 only part of the distance between hub 30 and rim 29. One end of a coiled spring 42 is transfixed within the tube 40 by a pin 44 adjacent hub 30. The opposite end of each spring 42 is fixed to rim 29 at point 46.

In the embodiment shown in FIGS. 1–2, springs 42 have a frequency which, during rotation of flywheel 28, does not interfere with the flywheel being vertically downwardly offset as shown in FIG. 2. To maintain this downward offset, springs 42 can be selected to produce the desired frequency at a given rotational velocity of flywheel 28, or the rotational velocity of the flywheel can be varied by speed control 20 until the flywheel rotates at a speed which interacts with the frequency of springs 38, offsetting flywheel 28 in a desired direction. For example, if the flywheel rotates at 360 revolutions/sec, and the springs have a frequency of 360 cycles/sec, the wheel will remain displaced vertically downwardly (as shown in FIG. 2) by the interaction of gravitational and centrifugal forces on rim 29 and flexing of springs 42.

Spring frequency for a loaded spring is $$f_1 = 187.6(Gd^4/8mgnD^3)^{\frac{1}{2}}$$

where mg is the load; G is $11.5 \times 10^6$ psi; n is the number of active coils of the spring; d is the diameter of the spring material; and D is the mean diameter of the spring.

In operation, motor 18 is energized to rotate shaft 26 and flywheel 28 in the direction of arrow 48. Speed control 20 is adjusted until flywheel 28 rotates at a speed that interacts with the frequency of springs 42 to maintain flywheel 28 vertically displaced downwardly, as seen best in FIG. 2. When flywheel 28 is viewed instantaneously at the position shown in FIG. 2, with spoke 38 at a six o'clock position, the force of gravity acting on flywheel 28 has extended spring 42 of spoke 38 and compressed spring 42 of spoke 34, while the springs of spokes 32, 36 are stretched to an extent intermediate the compression of the spring of spoke 34 and the extension of the spring of spoke 38. The springs of spokes 32 and 36 flex at an angle to these spokes. As flywheel 28 continues to rotate, spoke 38 moves to a seven o'clock position (not shown) and begins to contract, while spoke 40 moves from a three o'clock position to a four o'clock position (not shown) and begins to extend. Movements of all the spokes 32–38 are similarly synchronized as the already offset flywheel 28 which further offsets rim 29 to eccentric axis 50 a distance x below the axis of hub 30 defined by shaft 26. Flywheel 28 therefore rotates about an axis of rotation which is substantially parallel to and offset vertically downwardly from the axis of driving shaft 26.

When rim 29 rests on spokes 32–38 as shown in FIG. 2, the effective radius $R_2$ of the lower part of the flywheel is greater than the effective radius $R_1$ of the upper part of the flywheel. When rim 29 begins to rotate, the larger radius $R_2$ invokes a larger rotational velocity $V_2$ of a particle at $R_2$ relative to the velocity $V_1$ of a particle at $R_1$. Consequently, the developed centrifugal acceleration on rim 29 is unbalanced ($V_2^2/R_2 > V_1^2/R_1$) which increases the eccentricity of axis 50. Then the larger rotational velocity of $V_2$ relative to $V_1$ provides a resultant velocity vector in the direction of vector $V_2$. The magnitude of the resultant velocity vector $\Delta V_1$, of course, is $V_2 - V_1$. The rotational impulse, which is related to the resultant velocity, imparts movement to platform 12 in the direction of $V_2$. The rotational impulse $mV_2$, is larger than at the opposite point, $mV_1$. As the rotating and flexing flywheel's points, or the rotating and flexing dumbbell's weights change positions their rotational velocities change from $V_1$ to $V_2$ under the combined effect of the gravitational and centrifugal forces. That change in time constitutes acceleration. Since $V_1 < V_2$, their difference, $\Delta V$, points in the direction of $V_2$, at the point farthest from the axis of drive, and so does the related acceleration, $a = \Delta V/\Delta t$, where $\Delta t$ equals the time span of a half turn, $\frac{1}{2}f$, f being expressed in cps. Therefore, while the flexing and rotating body is offset by means described above, it is also offset to some extent in the direction of this invoked force, ma, where m represents the mass of the rotating, flexing body. This force is imparted to the vehicle through the driving shaft, causing the vehicle to move in the direction of this invoked force, while the energy to continuously reverse the process, lifting the points from $R_2$ back to $R_1$, is provided through the driving motor.

Second Embodiment

Another embodiment of the propulsion device is schematically shown in FIGS. 3 and 4. This device includes a central hub 170 which is rotated by a motor (not shown). Three rigid spokes 172, 174, and 176 project outwardly from hub 170 in a single plane with each of the spokes separated from each adjacent spoke of an arc of 120°.

Each of spokes 172, 174, 176 respectively carries a donut shaped weight 178, 180, 182 with the spoke extending through a central hole in the donut shaped weight. A first spring 184a is fixed at a first end within hub 170 and extends from hub 170 to weight 178 somewhere along spoke. A second spring 184b is attached at a first end to the weight and at a second end to the distal tip of spoke 172. Each weight 180 and 182 is similarly flexibly supported on spokes 174, 176 such that each weight 178–182 is free to slide along its respective spoke at a chosen frequency of springs 184. Preferably, the frequency of rotation of the system of spokes 172-176 should be the same as the frequency of springs 184.

In the disclosed embodiment, the springs are selected to have a frequency such that the center of mass of the rotating system will further be displaced downwardly as the spokes rotate. This downward displacement of mass is accomplished by the oscillation of weights 178-182 along the spokes 172-176 during rotation of the body. As seen in FIG. 3, spring 184a of weight 182 is extended relative to the springs 184a of weights 178 and 180 because weight 182 is pulled away from hub 170 under the influence of gravity, while weights 178, 180 are pulled closer to hub 170 under the influence of gravity. When the spokes of the rotating system assume the position shown in FIG. 3, the center of mass of the rotating system is displaced downwardly. As the spokes continue to rotate, the weights change position along the spokes to maintain the increased displacement of the center of mass downwardly from hub 170. For example, as the spokes turn in a clockwise direction from that shown in FIG. 3, weight 180 begins to move farther from hub 170, while weight 182 starts to move closer. By the time spoke 174 is pointing to the six o'clock position, weight 180 is fully extended.

FIG. 4 shows a means for varying the frequency of springs 184 to accommodate varying frequencies of rotation. Hub 170 carries a pinion 190 which meshes with a worm gear 192 on spoke 172, worm gear 194 on spoke 174, and worm gear 196 on spoke 176. As pinion 190 is rotated at a different rate than that of hub 170 by an otherwise synchronized auxiliary motor (not shown), worm gears 192-196 simultaneously rotate to turn spokes 172-176 and springs 184a and 184b, which coils or uncoils spring 184a into or out of hub 170 through a hole in the hub to the same extent. Increasing the number of active coils of spring 184a and 184b decreases the frequency at which the spring oscillates, while decreasing the number of active coils increases the frequency of oscillation. The effect of the operation of the second embodiment of the gyroscopic propulsion device is essentially the same as described previously.

Having illustrated and described the principles of the invention in preferred embodiments, it should be apparent to those skilled in the art that the invention can be modified in arrangement and detail without departing from such principles. I claim all modifications coming within the spirit and scope of the following claims.

I claim:

1. A gyroscopic propulsion device, comprising:
    a vehicle having means for supporting the same on a surface;
    a rotatable body mounted on the vehicle;
    rotating means for establishing a first substantially horizontal axis of rotation for rotating the body; and
    offsetting means comprising resilient elements which allow said body to initially offset by the effect of gravity and for offsetting said body by the force evoked by its rotation to a second axis of rotation, about which the body rotates, vertically and horizontally away from and substantially parallel to the first axis of rotation for propelling the vehicle.

2. The propulsion device of claim 1 wherein the offsetting means further comprises a means for offsetting the center of mass of the body.

3. The propulsion device of claim 1 wherein the body includes a plane of rotation, and the offsetting means includes means for displacing the body in the plane.

4. The propulsion device of claim 1 wherein the rotatable body comprises a hub connected to a flywheel with flexible spoke means for allowing the geometric center of the flywheel to be offset relative to the hub.

5. The propulsion device of claim 4 wherein the flexible spoke means comprises tubular spokes extending partially from the hub to the flywheel, and springs extending between the spokes and the flywheel.

6. The propulsion device of claim 5 wherein the flywheel is mounted in a vertical plane and the springs have a frequency which permits the flywheel to remain offset substantialy downwardly at the rotational frequency at which the rotating means rotates the flywheel.

7. The propulsion device of claim 1 wherein the rotating means comprises an axle fixed to the rotatable body coincident with the first axis and driven by a motor.

8. The propulsion device of claim 6 wherein the rotating means comprises an axle fixed to the hub and driven by a motor.

9. The propulsion device of claim 6 further comprising means for changing the frequency of the springs.

10. A gyroscopic propulsion device, comprising:
    a vehicle having means for supporting the same on a surface;
    a rotatable body mounted on the vehicle;
    rotating means for establishing a first axis of rotation for rotating the body; and
    propulsion means comprising resilient elements which allow said body to initially offset by the effect of gravity and for permitting said body as it rotates to offset to a second axis of rotation by the forces evoked by its rotation vertically and horizontally away from and parallel to said first axis thereby increasing the rotational impulse of the point of the rotating body which is farther away from the first axis than any other point on the body to propel the vehicle.

11. The propulsion device of claim 10 wherein the propulsion means comprises an offsetting means for offsetting the geometric center of the body to a second axis, about which the body rotates, away from and substantially parallel to the first axis.

12. The propulsion device of claim 10 wherein the propulsion means comprises an offsetting means for offsetting the center of mass of the body to a second axis, about which the body rotates, away from and substantially parallel to the first axis.

* * * * *